United States Patent [19]

Ruof

[11] 4,252,014
[45] Feb. 24, 1981

[54] BUILT-IN TEST CIRCUIT FOR ANTISKID SYSTEM

[75] Inventor: Edgar J. Ruof, Akron, Ohio

[73] Assignee: Goodyear Aerospace Corporation, Akron, Ohio

[21] Appl. No.: 35,148

[22] Filed: May 2, 1979

[51] Int. Cl.³ .......................................... G01M 17/00
[52] U.S. Cl. .................................. 73/129; 188/1 A; 303/92; 340/52 B
[58] Field of Search ............ 73/121, 129; 244/110 A, 244/111; 188/1 A; 340/52 B; 303/92

[56] References Cited

U.S. PATENT DOCUMENTS

| | | | |
|---|---|---|---|
| 3,818,433 | 6/1974 | Okamoto et al. | 188/1 A X |
| 3,852,613 | 12/1974 | Weinecke | 340/52 B X |
| 3,872,720 | 3/1975 | Fleagle | 73/121 |

Primary Examiner—Jerry W. Myracle
Attorney, Agent, or Firm—P. E. Milliken; E. W. Oldham; R. L. Weber

[57] ABSTRACT

A circuit incorporated with an antiskid system for testing the operability of the system. A multivibrator may be actuated to energize converter circuitry with a signal indicative of a particular wheel speed. The entire antiskid system is then caused to function as though the vehicle wheels are actually spinning and the vehicle is moving. The major subcircuits of the antiskid system are connected to logic circuitry which senses their operation and produces an output signal to a lamp which is illuminated when the subcircuits are properly operative. When the multivibrator operation is ceased, changes in operation of the various subcircuits is again sensed by the logic circuitry which, if such subcircuits are operating properly, deenergizes the lamp.

14 Claims, 1 Drawing Figure

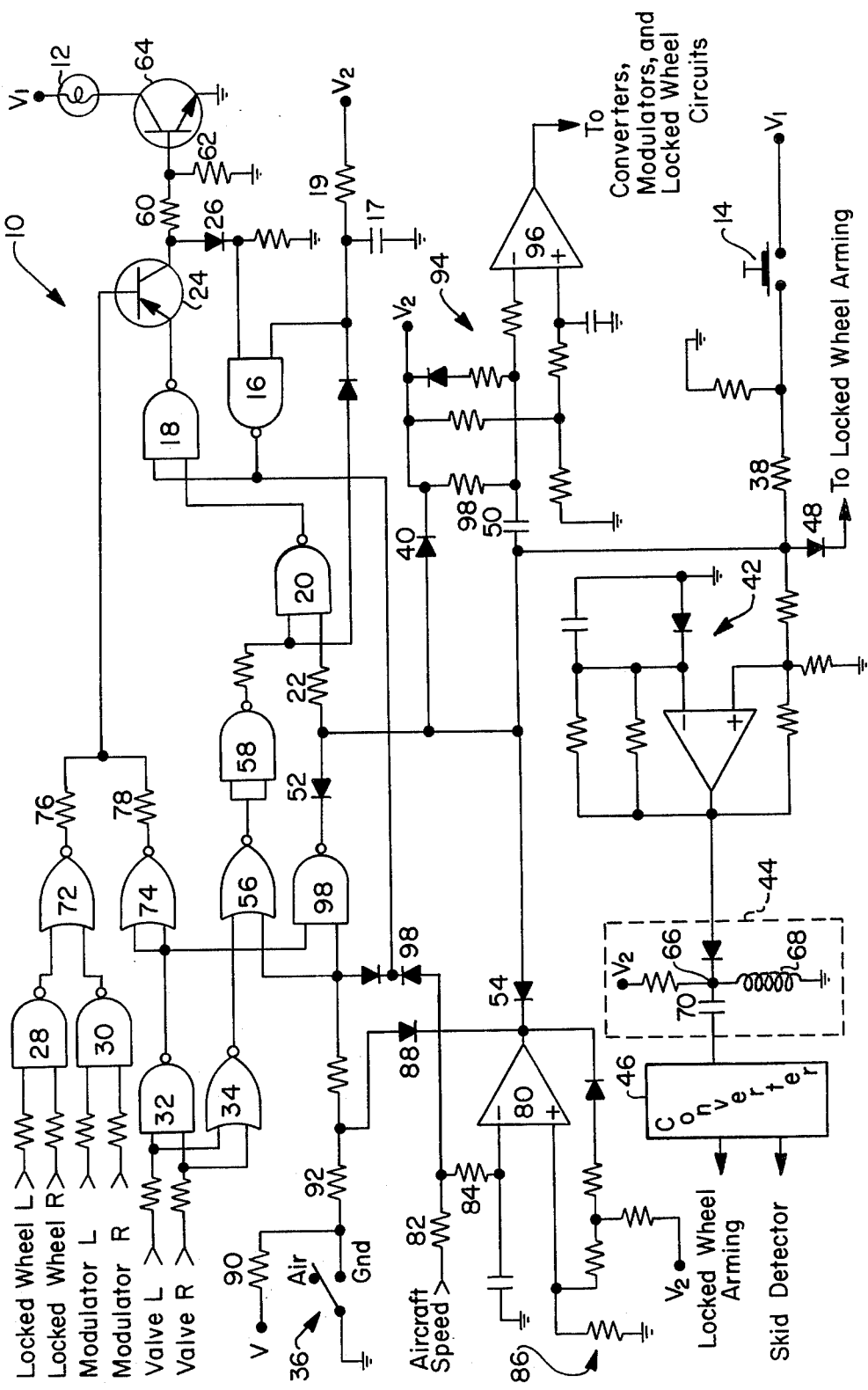

BUILT-IN TEST CIRCUIT FOR ANTISKID SYSTEM

BACKGROUND OF THE INVENTION

The instant invention resides in the art of antiskid systems for braked-wheel vehicles. While the system described hereinafter will be with respect to the adaptation of the invention to an antiskid system for an aircraft, it will be understood that the invention is equally applicable to all vehicles having antiskid systems. The invention is particularly related to improvements in antiskid systems and provides a means whereby an operator may make an operational check of the antiskid system at any of a number of times prior to calling upon the system in assisting in the braking of the vehicle.

Heretofore in the art, quite a large number of antiskid systems have been known and utilized. Present day systems are of a rather sophisticated and complex nature, this sophistication and complexity increasing the possibility of system malfunction. State-of-the-art antiskid systems include AC/DC converter circuitry connected to a transducer and supplying a voltage to a deceleration or rate detector. A skid detector is often controlled by the deceleration detector and is operative for controlling a modulator which, in turn, controls the reapplication of brake pressure which has been released upon sensing of a skid. Of course, such systems include electrohydraulic valves interconnected with the skid detector, modulator and, often times, locked wheel prevention circuitry. Each of the foregoing subcircuits of an antiskid system performs a vital function in the operation of the system and the control to be achieved thereby. Accordingly, it is desirable that a pilot or other operator be able to ascertain the operativeness of the system prior to its use.

In the past, there has been no extensive test available for testing an antiskid system on board. Indeed, it has been the practice of the aircraft industry to occasionally perform individual tests on the various wheels of an aircraft to determine whether the antiskid system was operative for that wheel. Such tests were not built into the aircraft and so require an extensive amount of work to perform. Hence, such tests were performed at rather spaced intervals on a routine basis. Of course, if the pilot felt that the antiskid system was not working properly, such as by the blowing of a tire on landing, further extensive tests of the antiskid system would be made. In the prior art, however, with only periodic rudimentary tests being made of the antiskid systems, problems with the systems were not detected until such problems were actually experienced when the antiskid system was in use. For example, the pilot might not know that the antiskid system on his aircraft was malfunctioning until he had landed on the runway and was in the midst of braking operations. Such late knowledge may result not only in damage to the vehicle, such as blown tires or the like, but also in bodily injury or discomfort to passengers. Therefore, there is needed a built-in test system incorporated with the antiskid system whereby an operator may make frequent functional checks of the system's operability and be apprised of any problem prior to the time when braking efforts would call upon the system to function. By being forewarned of such problems, the pilot or other operator may simply land more carefully and manually modulate brake pressure to achieve a safe and comfortable landing.

OBJECTS OF THE INVENTION

In light of the foregoing, it is an object of the instant invention to provide the improvement in an antiskid system of a built-in test circuit allowing a pilot to determine the operability of the antiskid system during taxiing or prior to landing.

Another object of the invention is to provide the improvement in an antiskid system of a built-in test circuit in which the simple depression of a test button is operative for testing all of the major circuits of an antiskid system.

Still another object of the invention is to provide the improvement in an antiskid system of a built-in test circuit in which a lamp will be successively illuminated and turned off by depression and release of a test button when the major circuits of the antiskid system are found to be operative.

Yet a further object of the invention is to provide the improvement in an antiskid system of a built-in test circuit which is reliable in operation, inexpensive to construct, simple to use, and conducive to implementation with virtually all state-of-the-art antiskid systems.

SUMMARY OF THE INVENTION

The foregoing and other objects of the instant invention which will become apparent as the detailed description proceeds are achieved by the improvement in an antiskid system for a wheeled vehicle having at least one locked wheel arming circuit connected to a locked wheel circuit, a modulator, a brake valve, and a converter connected to a wheel for producing an output signal indicative of wheel speed, comprising: activator means connected to the converter for providing a signal to the converter indicative of a particular wheel speed; logic circuit means interconnected with the locked wheel circuit, modulator, and valve, for sensing the responses thereof to said signal; and indicator means connected to and controlled by said logic circuit means for producing an indicia of said responses.

DESCRIPTION OF DRAWING

For a complete understanding of the objects, techniques, and structure of the invention, reference should be had to the following detailed description and accompanying drawing wherein there is shown a circuit schematic of the built-in test circuit of the invention as the same is interconnected with the various elements of an antiskid system.

DETAILED DESCRIPTION OF PREFERRED EMBODIMENT

Referring now to the drawing, it can be seen that the built-in test circuit of the instant invention is designated generally by the numeral 10 and is shown as being interconnected with the various elements of an antiskid system. The circuit shown is incorporated on an aircraft having two braked wheels, a left wheel and a right wheel, but it will be understood that the invention is equally applicable to antiskid systems on vehicles having any number of braked wheels or on systems wherein all wheels on each side of the aircraft are braked together. Suffice it to say at this time that one skilled in the art would, from the teachings herein, be capable of adapting the circuit described herein to any of numerous antiskid system configurations. In the circuit shown, both braked wheels are checked at the same time and the test utilizes a single indicator light or lamp 12, and a single pushbutton switch 14. As will become apparent hereinafter, a test may be conducted whenever the system power V1 is available and taxi speed is below 17 knots, or, when the aircraft is airborne, with the landing gear down in preparation for landing. Normally, the lamp 12 is not illuminated, but should be turned on when the test button 14 is pushed, and should be turned off when the button is released. Any other response is indicative of a failure of the antiskid system, the power sources V1 or V2 being off, or vehicle speed above 17 knots.

The test indicator or lamp 12 is controlled by the NAND gates 16, 18, which operate as a flip-flop latch. The quiescent state of the latch 16,18 is established when power is first applied. The capacitor 17 draws the initial turn-on of power from the source V2 through the resistor 19, thus momentarily holding the connected input of gate 16 to a logic 0. Accordingly, the output of latch 16 goes to a logic 1 and raises the connected input of the latch gate 18 to that level. The other input to the gate 18 is connected to the output of the NAND gate 20 which, via the grounding of the input connected to resistor 22, provides a logic 1 output. With both inputs of NAND gate 18 being at a logic 1, the output thereof is a logic 0 which, through the transistor 24 and diode 26, places a logic 0 on the remaining input of the gate 16. This holds the quiescent state of the latch 16,18 after power turn-on of V2 raises the input of gate 16 through the resistor 19. In this quiescent state, the indicator lamp 12 is out, since the output of gate 18 is low, keeping transistor 24 turned off.

As can be seen, the indicator circuitry just described is controlled by logic circuits interconnected with the locked wheel circuit, modulator, and valve for each of the left and right braked wheels. When the aircraft is on the ground, the locked wheel, modulator, and valve present logic level 0's to the associated logic gates 28–34, and the squat switch 36 is in the ground position. In this quiescent condition, the pushbutton switch 14 may be actuated to apply V1 to the resistor 38. The diode 40, connected to the V2 BUS, stabilizes the opposite side of resistor R38 at one diode drop above V2. This provides consistent performance of the circuitry 10 over a wide range of supply voltages.

While the switch 14 is engaged, the multivibrator 42 is actuated to provide a square wave to the transducers 44 and the converters 46. At the same instant, the locked wheel circuits are deactivated by the voltage supply to the locked wheel arming circuits via the isolation diode 48. The capacitor 50 is charged for purposes which will be discussed hereinafter, and the diodes 52,54 remain back-biased as they were before the switch 14 was actuated.

When the pushbutton switch 14 is actuated, a logic 1 is applied via the resistor 22 to the connected input of the NAND gate 20. The other input of the gate 20, fed via NOR gates 34,56, and NAND gate 58, is at a logic 1 due to the valve inputs both being at a logic 0 when the aircraft is on the ground and taxiing. The output of NAND gate 20 goes low, switching the output of latch gate 18 high, thus turning on the transistor 24 which, through resistors 60,62, turns on transistor 64 and lamp 12.

While the test button 14 is depressed and the multivibrator 42 is running, an AC signal voltage is applied to the junction 66 of the transducer 44. If the transducer winding 68 is open, the junction 66 is held high by the voltage source V2 and no signal is coupled across the capacitor 70 to the converter 46. Similarly, if the coil 68 is shorted, then the junction 66 is clamped to ground and no signal is coupled. Hence, a simple test of the transducer circuitry is performed.

If the transducers 44 are operative, the square wave output of the multivibrator 42 is converted to a DC voltage by the converters 46. The selected frequency of the multivibrator 42 results in a DC output of the converters 46 equivalent to approximately 38 knots ground speed. In standard fashion, the converter is connected to a locked wheel arming circuit and skid detectors, the former being armed by the DC voltage and the latter being charged to operating potential.

When the test button 14 is released, the multivibrator 42 ceases operation. The outputs of the converters 46 drop to 0, causing the skid detectors to sense a skid and each locked wheel detector to sense a locked wheel. The valves then momentarily receive a full dump signal resulting in logic 1's being experienced at the inputs of gates 32,34. There is correspondingly a rise in modulator voltage with the inputs of NAND gate 30 going to a logic 1. This rise in modulator voltage is an indirect test of the skid detectors since, in part, the skid detectors control the modulator. Of course, the inputs to the NAND gate 28 are also at a logic 1 due to the sensing of a locked wheel. The outputs of NOR gates 72,74 will both be at a logic 1 since the inputs thereto are at logic 0's.

Release of the pushbutton switch 14 drops the input of the gate 20 through the resistor 22 to a logic 0, the other inputs staying at a logic 1 until valve dump occurs. The output of gate 20 goes to a logic 1, but the output of latch gate 18 remains high since the other input thereto, the output of the latch gate 16, is at a logic 0 from the moment the switch 14 is depressed. Indeed, the latch 16,18 is switched only by the outputs of the NOR gates 72,74. With logic 1's at the inputs of gates 28–32, the NOR gates 72,74 also present logic 1 outputs which are applied through resistors 76,78 to the base of transistor 24. The transistor is thereby gated off, dropping the input of NAND gate 16 through diode 26 to a logic 0, thus providing a logic 1 at the output thereof. With gate 18 having logic 1's at both inputs thereof, the output latch is at a logic 0, holding the transistor 24 off. Accordingly, transistor 64 is gated off and the lamp 12 is no longer illuminated.

It should be apparent that the lamp 12 is only turned off by the combination of proper logic levels from locked wheel circuits, modulator, and valves, and that the illumination of the same was achieved only by sensing of the proper quiescent states of such subcircuits of the antiskid system.

An inhibit circuit comprising the operational amplifier 80 and associated components is provided to allow the test of the antiskid system to be performed when the vehicle is taxiing at speeds less than a predetermined level, for example, 17 knots. The aircraft speed is supplied via resistors 82,84 to the negative input of the amplifier 80. When the aircraft speed exceeds the predetermined level established by the voltage divider 86 at the positive input of the amplifier 80, the output of the amplifier goes low, thus making operation of the test button 14 ineffective due to the voltage drop over resistor 38. Hence, when the aircraft ground speed is above a predetermined level, the test of the antiskid system provided by the test circuit 10 may not be made.

Also connected to the output of the amplifier 80 is a diode 88, connected through the resistors 90,92 to the squat switch 36. The diode 88 serves as a clamp to prevent the airborne condition of the squat switch 36 from affecting the logic circuits of the test circuit 10 immediately after takeoff.

A test termination circuit 94 is provided to restore the antiskid circuitry to its pre-test condition. An operational amplifier 96 provides a low level output before and during the test cycle until switch 14 is released. Upon release of the switch 14, the capacitor 50, which became discharged when the button 14 was depressed, is charged via the resistor 98. A positive going pulse is then emitted from the amplifier 96 of a time duration dependent upon the time constant of the RC circuit 50,98. This positive going pulse is applied to the modulators to provide a quick discharge of the modulator capacitor. It is similarly applied to the locked wheel arming capacitor to provide a quick discharge thereof. Simultaneously, it is applied to the converter circuit which, for the duration of the pulse, provides an interim signal which drops the converter output to 0 even if the test is conducted during taxiing below the threshold level established by the vehicle ground velocity should the test be conducted during taxiing.

It should at this time be noted that the diode 98 is provided to hold the negative input of the operational amplifier 80 at a low level during the system test so that the output of the converter circuits 46, higher than the threshold speeds set by the voltage divider 86, will not activate the inhibit circuit 80. In other words, when the button 14 is depressed, the test may be begun only if aircraft speed is less than a certain threshold level. If this is the case, the anode of the diode 48 is held to a low level by the latch 16,18 to keep the negative input of the amplifier 80 low, maintaining a high level from the amplifier.

With the test button 14 and lamp 12 maintained within the cockpit, a pilot may conduct the test provided by the circuit 10 either while taxiing below a certain threshold level or while in the air with the landing gear down in preparation for the landing approach. The test is conducted in the same manner with the same result in either instance. When taxiing on the ground, if either of the valves is dumped, the lamp 12 will not illuminate. Similarly, in the air, if a valve is not dumped, the lamp 12 will not turn on. Accordingly, the input to gates 32,34 vary in accordance with whether the test is performed in the air or on the ground. However, the logic treatment given the squat switch 36 compensates for the difference in valve voltage between the air and ground positions. In the air, squat switch 36 provides a logic 1 to inputs of the NOR gate 56 and NAND gate 98 while, on the ground, logic 0's are applied on these inputs. Similarly, the output of NAND gate 32 and NOR gate 34 are respectively applied to the gates 98,56. The result is that the output of NAND gate 20 is the same whether the aircraft is in the air or on the ground. It is this output which controls the latch 16,18 with respect to the valves and squat switch 36, and with the proper output signal from the NOR gates 72,74, with respect to the locked wheel circuit, modulator, and valve circuits, proper energization or deenergization of the lamp 12 is achieved.

Thus, it can be seen that a circuit has been provided which may be interconnected with any of numerous presently existing antiskid circuits to achieve a fast, effective, and reliable test of the operability of the antiskid system. While in accordance with the patent statutes, only the best mode and preferred embodiment presently known to the applicant has been presented and described in detail, it is to be understood that the invention is not limited thereto or thereby. Consequently, for an appreciation of the true scope and breadth of the invention, reference should be had to the appended claims.

What is claimed is:

1. In an antiskid system for a wheeled vehicle having at least one locked wheel arming circuit connected to a locked wheel circuit, a modulator, a brake valve operatively connected to and effected by the locked wheel circuit and modulator, and a converter connected to a wheel for producing an output signal to the locked wheel circuit and modulator indicative of wheel speed, the improvement comprising:

activator means connected to the converter for providing a signal to the converter indicative of a particular wheel speed;

logic circuit means interconnected with the locked wheel circuit, modulator, and valve, for sensing the responses thereof to said signal; and indicator means connected to and controlled by said logic circuit means for producing an indicia of said responses.

2. The improvement according to claim 1 wherein said activator means comprises a multivibrator.

3. The improvement according to claim 2 which further includes inhibit circuit means connected to said activator means for inhibiting operation of said activator means when the vehicle is moving at a speed exceeding a predetermined level.

4. The improvement according to claim 1 wherein said logic circuit means includes logic gates receiving signals from each of the locked wheel circuit, modulator, and valve, each logic gate producing an output signal indicative of the signal received from the associated locked wheel circuit, modulator, or valve.

5. The improvement according to claim 4 wherein said output signals are applied to, and control, said indicator means.

6. The improvement according to claim 5 wherein said activator means includes an operator actuated switch, said activator means providing said signal only during actuation of said switch.

7. The improvement according to claim 6 wherein said indicia produced by said indicator means in response to the actuation of said switch is indicative of the operability of the antiskid system.

8. The improvement according to claim 6 which further includes circuit means interconnected between said switch and the modulator and converter for momentarily terminating operation of the modulator and converter immediately upon termination of actuation of said switch.

9. In an aircraft having an antiskid system including a locked wheel arming circuit connected to a locked wheel circuit, a modulator, a brake valve operatively connected to and controlled by the locked wheel circuit and modulator, and a converter connected to a wheel for producing an output signal indicative of wheel speed to the locked wheel circuit and modulator, a built-in test circuit, comprising:

a multivibrator connected to the converter and providing a test signal thereto;

a plurality of logic gates connected to at least certain of said locked wheel circuit, modulator, and brake valve and producing output signals corresponding to the responses of the locked wheel circuit, modulator, and brake valve to said test signal; and indicator means connected to said logic gates, receiving said output signal and responding thereto to produce an output indicative of the operability of the antiskid system.

10. The built-in test circuit according to claim 9 which further includes a switch connected to and actuating said multivibrator, the output of said indicator means with respect to the state of said switch indicating the operability of the antiskid system.

11. The built-in test circuit according to claim 9 which further includes a blocking circuit connecting to said multivibrator and inhibiting the operation of said multivibrator when the ground speed of the aircraft is above a predetermined level.

12. The built-in test circuit according to claim 11 which further includes a test termination circuit interconnected between said switch and the modulator and converter for momentarily terminating operation of the modulator and converter under control of said switch.

13. The built-in test circuit according to claim 9 wherein said indicator means includes a lamp.

14. The built-in test circuit according to claim 13 wherein said lamp is illuminated under control of said switch and said output signals from said logic gates.

* * * * *